US008718281B2

(12) United States Patent
Mishra et al.

(10) Patent No.: US 8,718,281 B2
(45) Date of Patent: May 6, 2014

(54) REKEY SCHEME ON HIGH SPEED LINKS

(75) Inventors: Chandan Mishra, Sunnyvale, CA (US); Srinivas C. Javagal, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 508 days.

(21) Appl. No.: 12/756,711

(22) Filed: Apr. 8, 2010

(65) Prior Publication Data

US 2011/0252231 A1  Oct. 13, 2011

(51) Int. Cl.
*H04L 9/00* (2006.01)
*H04L 29/06* (2006.01)

(52) U.S. Cl.
USPC .............. 380/277; 380/44; 713/154; 713/160

(58) Field of Classification Search
USPC .............................. 380/44, 277; 713/154, 160
See application file for complete search history.

(56) References Cited

U.S. PATENT DOCUMENTS

| | | | |
|---|---|---|---|
| 2009/0161874 A1* | 6/2009 | Eun et al. ...................... | 380/277 |
| 2009/0217032 A1* | 8/2009 | Guan ........................... | 713/154 |
| 2009/0262937 A1* | 10/2009 | Hirth et al. .................... | 380/256 |

OTHER PUBLICATIONS

IEEE Standard for Local and metropolitan area networks Media Access Control (MAC) Security 802.1AE™ Aug. 18, 2006.*
IEEE P802.1af/D1.7 Draft Standard for Local and Metropolitan Area Networks—Port-Based Network Access Control—Amendment 1: Authenticated Key Agreement for Media Access Control (MAC) Security Nov. 10, 2007.*

* cited by examiner

*Primary Examiner* — Kambiz Zand
*Assistant Examiner* — Benjamin Kaplan

(57) ABSTRACT

In one embodiment, apparatus and methods for a rekey process are disclosed. In certain rekey embodiments, when a key-generation protocol exchange is executed, instead of generating a single new security relationship, such as a Security Association or SA, a multiple set (e.g., 10) of new security relationships (e.g., SAs) are generated. An authorized device can then individually use these security relationships (e.g., SAs) as needed to securely communicate with each other. For example, a set of SAs can be efficiently programmed into an 802.1ae protocol ASIC for handling transmitted and received data packets. In the description herein, embodiments of the invention are described with respect to SA's, and this "SA" term is generally defined as any type of security relation that can be formed to allow a particular node to securely transmit packets or frames to another receiving node.

20 Claims, 6 Drawing Sheets

REKEY SCHEME ON HIGH SPEED LINKS

BACKGROUND

The present invention relates to point-based network access control for devices to securely communicate with each other over high speed links. More particularly, it relates to authentication and authorization processes, such as the 802.1ae rekey process, for providing security for packets being transmitted between devices.

BRIEF DESCRIPTION OF THE DRAWINGS

The present invention is illustrated by way of example, and not by way of limitation.

DESCRIPTION OF EXAMPLE EMBODIMENTS

Figure 1A:
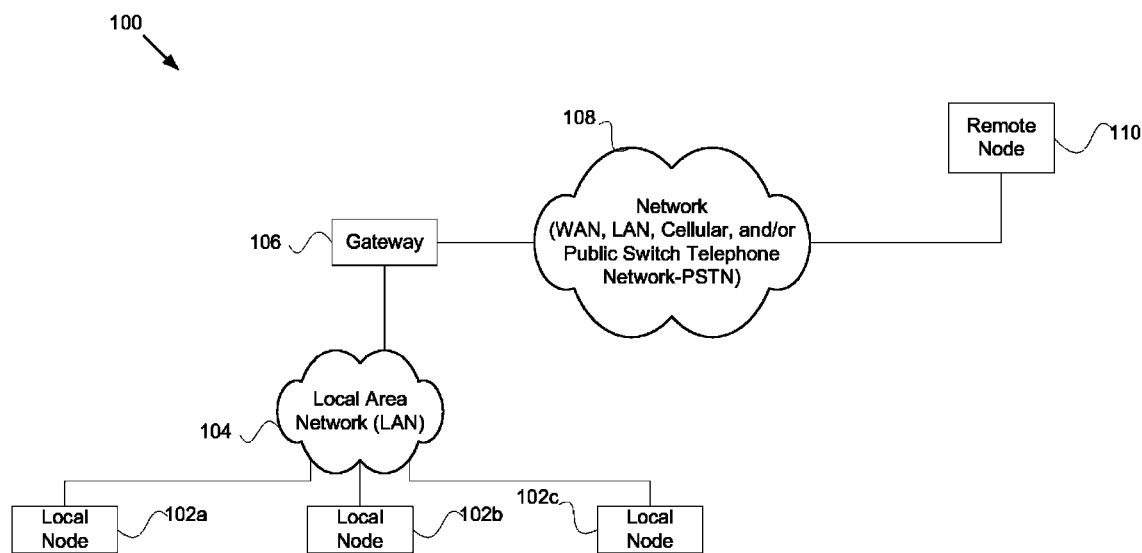
FIG. 1A is a diagrammatic representation of a network in which rekey embodiments of the present invention may be practiced.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

One standard for link-level Ethernet encryption is the 802.1ae IEEE standard. An 802.1ae header has a 32 bit wide packet number (PN) field which is used for replay protection. With every packet sent to a security association (SA), PN should increment. The receiving node tracks the validity of this SA at least, in part, by checking whether PN is incremented with each packet received for the particular SA. When a rekey process is performed by a device that already has a SA, a new SA is provided to the rekeying node and the PN can then restart at 0 for the next packet with the new SA. This process means that on a link, rekey should be done before the PN field wraps around (e.g., reaches the $2^{32}$ maximum). For a 1G (a first generation mobile communication standard that is 1 gbps (gigabits per second) link, in a worst case scenario of 64 Byte packets and full linerate traffic, the rekey interval has to be 35 minutes or less. For a faster 10G link, the rekey interval has to be 3.5 minutes. For an even faster 40G link, the rekey interval has to be 53 seconds. For the fastest current 100G link, the rekey interval has to be 20 seconds. These requirements may be difficult to meet with certain network devices, which can barely handle a 3.5 minute rekey interval. Accordingly, certain network devices cannot support rekey for 40/100G link.

Overview

In certain rekey embodiments, when a key-generation protocol exchange is executed, instead of generating a single new security relationship, such as a Security Association or SA, a multiple set (e.g., 10) of new security relationships (e.g., SAs) are generated. An authorized device can then individually use these security relationships (e.g., SAs) as needed to securely communicate with each other. For example, a set of SAs can be efficiently programmed into an 802.1ae protocol ASIC for handling transmitted and received data packets. In the description herein, embodiments of the invention are described with respect to SA's, and this "SA" term is generally defined as any type of security relation that can be formed to allow a particular node to securely transmit packets or frames to another receiving node.

In one embodiment, apparatus and methods for rekey are disclosed. In one embodiment, a method for a first node includes (i) the first node participating with a second node in a key generation exchange to thereby allow the first node to transmit secure packets to the second node, (ii) during participation in the key generation exchange, obtaining at the first node key generation information that includes a plurality of current security associations that differ from each other, (iii) after the key generation exchange, sequentially sending, from the first node to the second node, a first set of secure packets that each include a first one of the current security associations, the first set of secure packets further comprising different incremented packet numbers, wherein the different incremented packet numbers are contained in a packet field that is sized to hold values in a range from a minimum value up to a maximum value, (iv) after sending a last packet of the first set of secure packets, wherein the last packet has a packet number that is a predefined amount from the maximum value, sequentially sending, from the first node to the second node, a next set of secure packets that each include a next one of the current security associations, the next set of secure packets further comprising different incremented packet numbers. Such sending of the next set of secure packets is accomplished without the first node participating with the second node in another key generation exchange.

In another embodiment, the invention pertains to a rekey receiver method that includes (i) a first node participating with the second node in a key generation exchange to thereby allow the first node to receive secure packets from the second node, (ii) during participation in the key generation exchange, retaining at the first node key generation information that includes a plurality of current security associations for the second node that differ from each other, (iii) for each secure packet received by the first node from the second node, determining that the received secure packet is valid based on whether a security association of the received secure packet matches a retained security association for the second node and whether a packet number of the received secure packet has been incremented for the matching security association; and (iv) processing each valid packet.

In other embodiments, the invention pertains to an apparatus or system having one or more processors and one or more memory, wherein at least one of the processors and memory are adapted for performing the above described receiver and/or transmitter method operations.

Specific Example Embodiments

Rekey embodiments of the present invention may be implemented in any suitable manner, which depends on the particular protocols and/or applications being utilized by the particular device. FIG. 1A is a diagrammatic representation of a network in which rekey embodiments of the present invention may be practiced. As shown, a network 100 can include a plurality of nodes (local nodes 102*a*, 102*b*, 102*c*, and remote node 110) that communicate with each other, e.g., through gateway 106 or via routers (not shown) within local area network (LAN) 104. The LAN 104 may be communicatively coupled to another network 108 (e.g., wide area network or WAN, such as the Internet, a cellular network, and/or a public switch telephone network or PSTN).

A LAN may be set up to allow an external or mobile device to attach to the LAN infrastructure or access the LAN through a device that is attached to the LAN. For example, a business corporation may allow an outside visitor to connect to the corporation LAN. When an unauthorized user or device is allowed to attempt LAN connectivity, access may be restricted so that only particular authorized users and/or devices may utilize particular services offered by the LAN. That is, some form of network access control is typically implemented when providing LAN connectivity for external or mobile users and devices (although such security may also be implemented for internal users and devices).

The 802.1X protocol describes a mechanism for providing network access control via a key exchange process, and this protocol is described in "DRAFT Standard for Local and Metropolitan Area Networks—Port Based Access Control (Revision), IEEE P802.1X-REV/D11, Jul. 22, 2004, which document is incorporated herein by reference in its entirety. The 802.1X protocol describes a port-based network access control that makes use of the physical access characteristics of IEEE 802 Local Area Networks (LAN) infrastructures in order to provide a way of authenticating and authorizing a device attached to a LAN port that has point-to-point connection characteristics, and of preventing access to that port in cases in which the authentication and authorization process fails.

In general, an access port and devices can negotiate network access to a particular LAN resource using the protocol 802.1X, although any suitable access protocol may be utilized. A key exchange process is used to share keys between a transmitting and a receiving node for facilitating point-to-point communication. In this example, the 802.1X "supplicant" and "authenticator" terms will be initially utilized, and are not meant to limit the scope of the invention to this particular protocol. A supplicant generally obtains or attempts to gain permission from an authenticator to gain access to a particular network, such as a local area network. In embodiments of the present invention, a supplicant can seek permission from an authenticator to gain access to a particular domain or VLAN. In the illustrated example, gateway (e.g., 106) may be configured to serve as an authenticator, while other devices (e.g., local node 102*b* or remote node 110) can be configured to act as a supplicant to gain access to another device (e.g., local node 102*a*).

The 802.1ae protocol (referred to as "MACSec") describes additional mechanisms for linked devices to set up secure communication with each other. This protocol is described in "IEEE Standard for Local and metropolitan area networks—Media Access Security, IEEE P802.1AE-2006, which document is incorporated herein by reference in its entirety. This MACSec protocol allows authorized systems that attach to and interconnect LANs in a network to maintain confidentiality of transmitted data and to take measures against frames transmitted or modified by unauthorized devices.

Although certain embodiments are described as being implemented with respect to the 802.1ae protocol, novel rekey embodiments can be also applied to other security protocols, e.g., that provide key generation and replay protection for the data traffic. Typically, replay protection is provided using a sequence number (e.g., such as a Packet Number in the illustrated 802.1ae example). Specific alternative embodiments may be implemented with respect to the IPSec (IP security protocol), FCSP (Fibre Channel Security Protocol), ESP (Encapsulation Security Protocol), etc. Additionally, inventive embodiments may be applicable to any size of sequence number, in addition to 32 bits as described herein.

Figure 1B:
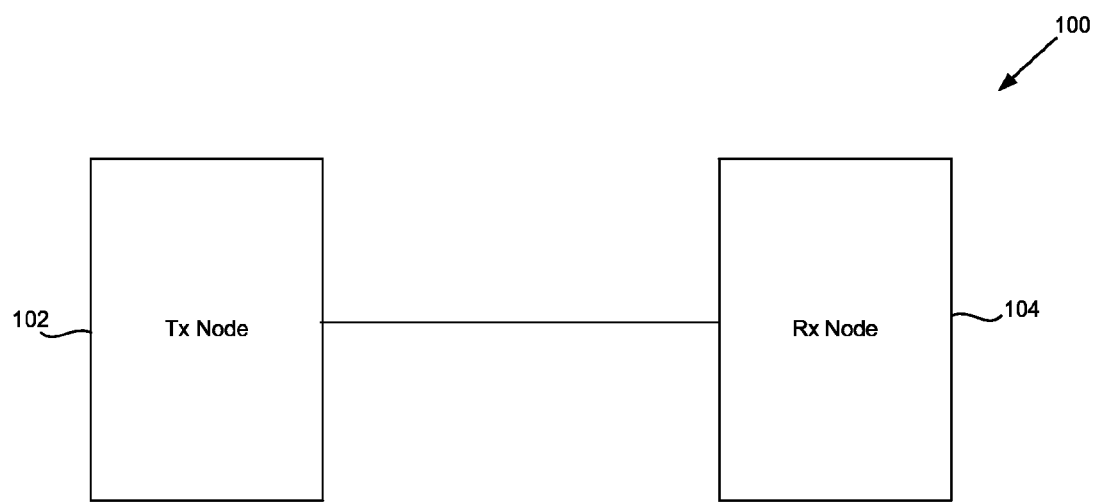
FIG. 1B is a diagrammatic representation of a linked transmitter (Tx) and receiver (Rx) node.

Referring again to the 802.1ae protocol, one preventative aspect of MACSec protects against replay problems caused by unauthorized users. FIG. 1B is a diagrammatic representation of a linked transmitter and receiver node. Although operation of a Rx node is described separately from operations of a Tx node, each device or node may be configured to implement both a Rx module and a Tx module. Each type of module is described separately herein. In the illustrated example, a transmit (Tx) node 102 negotiates a key exchange with a receive (Rx) node 104 so that the Tx node can send secure packets to the Rx node 104. In one example, this relationship is defined, at least partly, by a security association (SA) that can specifies a security relationship so as to provide security guarantees for frames transmitted from the Tx node to the Rx node. In the MACSec embodiment, both the Tx and Rx nodes are both members of a same channel association (CA) and an SA is only specified for members of the same CA. Each SA can be supported by a single secret key, or a single set of keys where the cryptographic operations used to protect one frame require more than one key.

Figure 2:
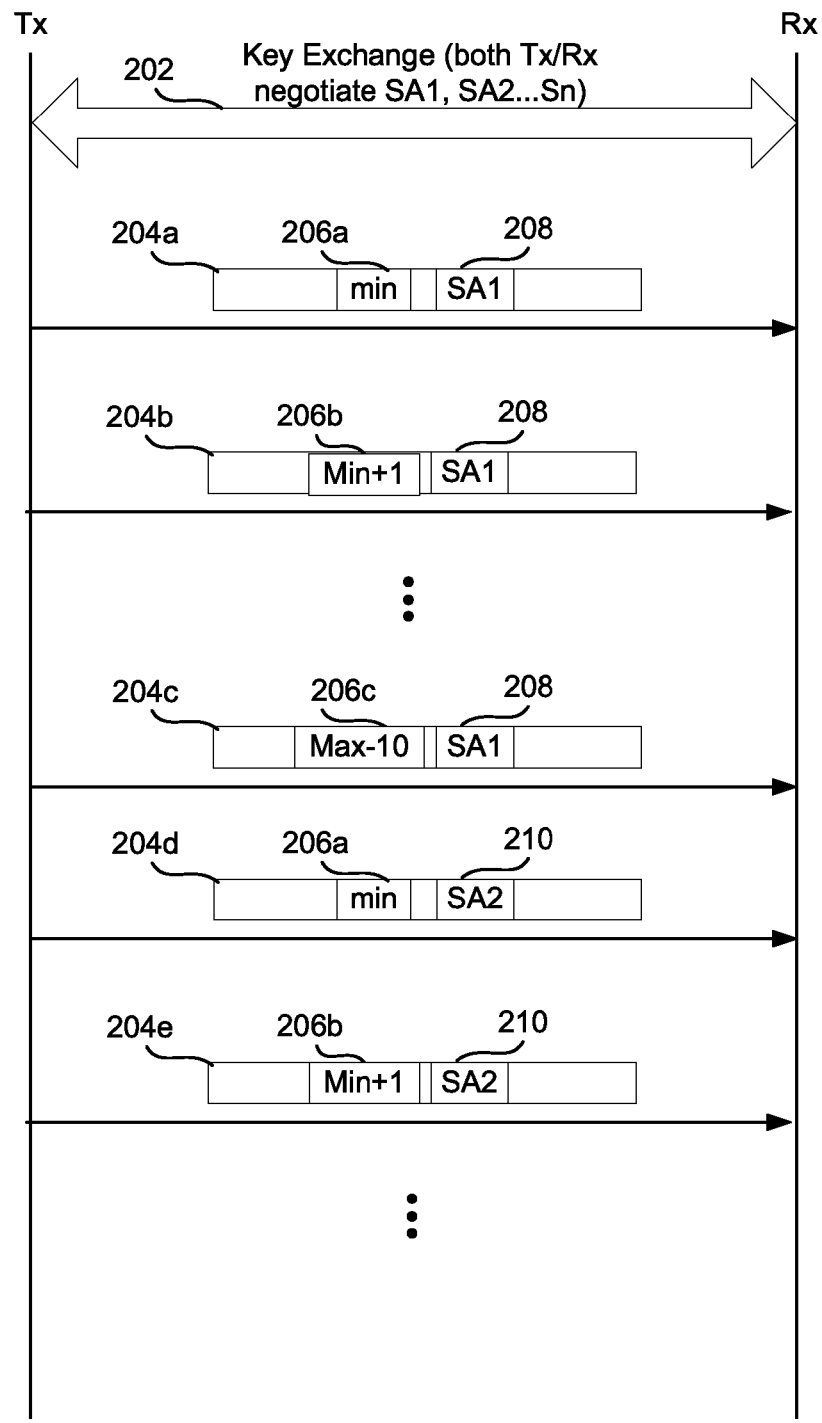
FIG. 2 illustrates transmission of secure packets from a Tx node to a Rx node in accordance with one embodiment of the present invention.
Figure 3A:
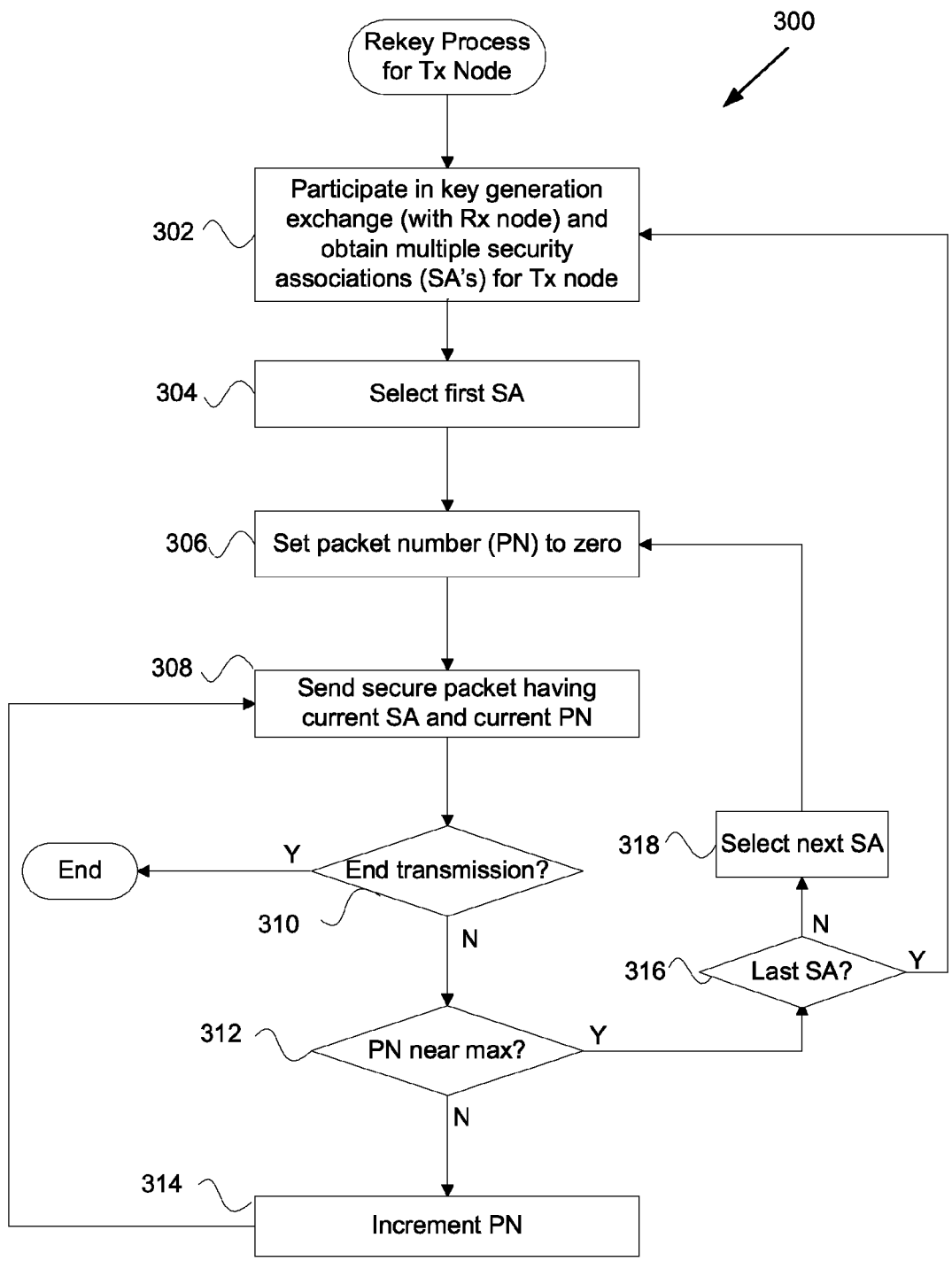
FIG. 3A is a flow chart illustrating a rekey procedure for a Tx node in accordance with a specific implementation of the present invention.

FIG. 2 illustrates transmission of secure packets from a Tx node to a Rx node in accordance with one embodiment of the present invention. FIG. 3A is a flow chart illustrating a rekey procedure 300 for a Tx node in accordance with a specific implementation of the present invention. Initially, the Tx node participates in a key generation exchange (e.g., 202 of FIG. 2) and obtains multiple security associations (SA's) via such exchange, in operation 302. One example of key generation exchange is described in the above referenced 802.1X document. One or more shared keys are also obtained for the Tx node and Rx nodes during the key exchange, and these keys can be used by the Tx node to encrypt packets and by the Rx to decrypt packets received from the Tx node. The same set of keys, as well as other key exchange information, can be negotiated by each Tx and Rx node. For instance, the set of keys may not have to be sent over the wire, but can be determined by each node based on whatever key exchange protocol is utilized.

During the key exchange, multiple SA's (e.g., 10 SA's) are provided to the Tx node for use in transmitting secure packets from the Tx node to the Rx node. The Tx may retain and utilize the received SA's as described further herein. In the illustrated example, a first SA for the Tx node may be selected (from the received multiple SA's) in operation 304. A packet number (PN) may be set to 0 in operation 306. A secure packet having the current SA and current PN may be then sent from the Tx node to the Rx node in operation 308. The secure packet will contain encrypted data, which can be generated using one or more keys from the key generation information. As illustrated in FIG. 2, Tx sends an initial secure packet 204*a* having a minimum or zero value in the PN field 206*a* and a first SA value of "SA1" 208.

It may then be determined whether transmission is ending in operation 310. If transmission is ending, the procedure 300 ends. For example, the Tx node may have completed transmission of its secure data and close out the current secure session with the Rx node (e.g., by sending a stop message). If transmission is not ending, it may be determined whether the PN is near a maximum value in operation 312. If the PN is not near the maximum, the PN may be incremented in operation 314. A secure packet having the same current SA and a new current PN (incremented PN) may then be sent in operation 308. For example, as shown in FIG. 2, Tx sends a next packet 204b having a "minimum+1" or 1 value in the PN field 206b and the same current SA value of "SA1" 208.

The Tx may continue to send secure packets with incremented PN's to Rx until the current PN reaches close to the maximum (e.g., has reached a predefined value that is less than the maximum PN value or at a predefined percentage of the total PN range). As shown in FIG. 2, when the Tx node sends packet 204c having a "maximum−10" in the PN field 206c and the same current SA value of "SA1" 208, it may be determined that the PN number is close to maximum.

When the PN is close to maximum, it may then be determined whether a last SA for Tx has been reached in operation 316. If the last SA for Tx has not been reached, a next SA for the Tx node may then be selected (from the current set of received SA's) in operation 318. The PN may then be reset to zero in operation 306. Secure transmission can repeat for incremented values of PN and the new next SA for the Tx node in operations 308~314. As shown, secure packet 206d is initially sent with a reset minimum PN value 206a and a new SA2 value 210, and then a next secure packet 206b is sent with an incremented minimum+1 PN value 206b and the same new current SA2 value 210.

When the last SA (e.g., SA10 for a set of 10 SA's) has been reached, the rekey procedure 300 may then initiate participation in another key generation exchange (rekey) with the Rx node and obtain another set of SA's in operation 302. The Tx node can then send secure data using individual ones of the new set of SA's and incremented PN values for each selected SA. For example, the old set of SA's may be numbered 1~10, while the new set of SA's are numbered 11~20.

Each SA for the Tx may be individually selected for transmission in any suitable manner. In one implementation, the received SA's may be used in a sequential manner, depending on their values (e.g., form highest to lowest). Switching to a next SA may be accomplished in any suitable manner. For example, an 802.1ae ASIC (application specific integrated circuit) may be configured to detect that the PN is close to wrapping around and automatically switch to a new TX SA. In another implementation, an 802.1ae ASIC can be configured to detect that the PN is close to wrapping around and generate an interrupt and then an external FPGA (field-programmable gate array) is configured to then reprogram the 802.1ae ASIC to switch to a new SA for the Tx node. Alternatively, an external FPGA may include (or be associated with) a timer, which is set based on the link speed, and reprogram an 802.1ae ASIC to switch to a new TX SA for the Tx node. In another example, an 802.1ae ASIC is configured to detect that the PN is close to wrapping around and generates an interrupt and software running on a CPU (and its associated memory) of the network device is configured to reprogram an 802.1ae ASIC to switch to a new SA for the Tx node. When the rekey trigger is based on a timer, rekey may depend on the number of SA's and the link speed. For example 10 SA's for a 100G link may last 3.5 minutes before a next rekey is needed.

Figure 3B:
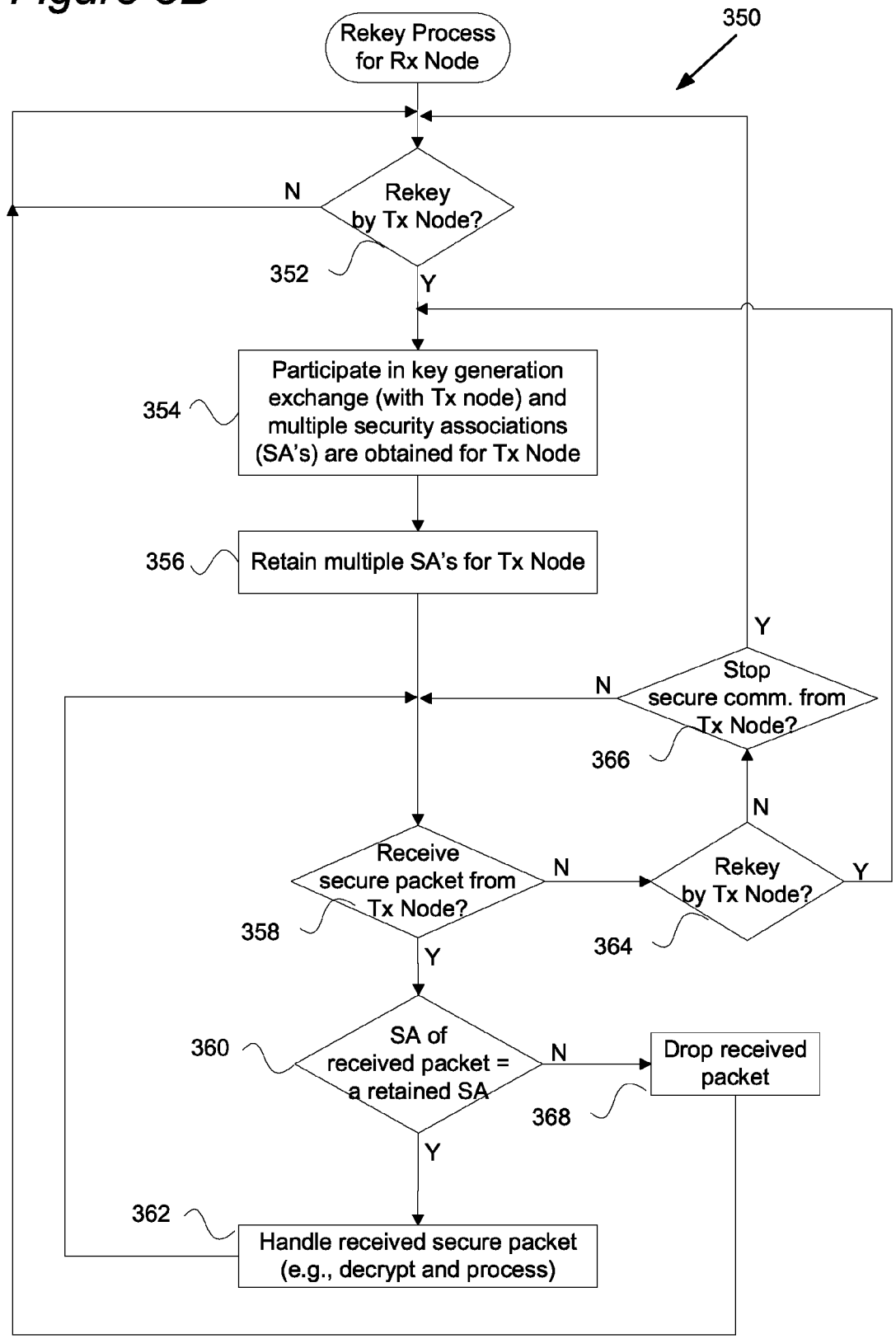
FIG. 3B is a flow chart illustrating a rekey procedure for an Rx node in accordance with one embodiment of the present invention.

On the Rx side, all of the SA's for a particular Tx may remain active until another rekey is performed by such Tx. FIG. 3B is a flow chart illustrating a rekey procedure 350 for an Rx node in accordance with one embodiment of the present invention. It may initially be determined whether a rekey (or initial key exchange) is being initiated with respect to a specific associated Tx node in operation 352. If a rekey is not occurring, the procedure 350 may continue to wait. Otherwise, when a rekey is initiated, the Rx node may then participate in a key generation exchange with the Tx node and multiple SA's are obtained for the Tx node in operation 354. For example, 10 SA's or any suitable number may be negotiated by the Rx node and the Tx node (or obtained from another intermediary device, such as an authenticator). These multiple SA's for the specific Tx node (as well as other key generation information) may be retained in operation 356 for later use in received frames.

It may then be determined whether a secure packet has been received (e.g., by the Rx node) from the specific Tx node in operation 358. When a secure packet has been received, it may then be determined whether the SA of the received packet equals (e.g., matches) a retained SA in operation 360. If there is a match, the received secure packet may then be handled in operation 362. For example, the received secure packet's encrypted data is decrypted using one or more keys from the key generation information. If a SA of the received packet does not match a retained SA, the received packet may be dropped in operation 368.

The received packet may also be checked to determine, for the current SA, whether the currently received PN is an incremented value of the previously received secure packet. For example, the Rx may track the received PN and corresponding SA values, and determine whether a first SA value is used with an incremented set of PN's and a next SA is then used with an incremented set of PNs. If it is determined that the PN for a matching SA has not been incremented properly, the packet may be dropped or error handling may be initiated. Otherwise, the received secure packets may be decrypted and processed.

It may also be determined whether a rekey has again been initiated by the specific Tx node in operation 364. For example, the Tx node may have used all their SA's and is now requesting more SA's for itself. If a rekey has been initiated, the Rx node may participate in key generation with the requesting Tx node and send a different set of SA's to the Tx node in operation 354. The procedure may then repeat for this set of SA's.

If a rekey has not been received, it may be determined whether to stop the secure communication from the Tx node in operation 366. For example, the Tx may specify a stop of the secure communicate with the particular Rx node. If a stop with respect to the Tx node is determined to have occurred, the procedure 350 may again wait for a rekey by a specific Tx node in operation 362. If a stop has not occurred, the process may wait to receive another secure packet from the Tx node in operation 358.

Certain embodiments of the present invention provide particular advantages. For example the SAP (Security Association Protocol), which is available from Cisco Systems, Inc. of San Jose, Calif., can be used as the key generation protocol for 802.1ae. For this new rekey scheme, the SAP protocol message format does not have to be changed—only the operation at each SAP peer.

Embodiments of the present invention may allow more keying material. SAP peers currently generate 512 bits of keying material, out of which 128 bit encryption key is derived. If 10 new SAs are generated, instead of 1 new SA, SAP peers can now derive 1536 bits of keying material. Of this keying material, 10 encryption keys can be derived, which each key can be used for each individual SA. For 802.1ae, the SCI/AN (secure channel identifier and association number) pair identify a SA. Currently, during an SAP exchange each side sends 1 SCI/AN pair to the peer. With the new rekeying scheme, each peer can send 10 SCI/AN pair to the peer. Each SCI/AN pair can then identify one of the 10 SAs.

The 802.ae protocol does not require modification with the presented rekey scheme. Additionally, how devices handle secure packets does not have to be changed with embodiment of the present invention. For example, certain implementations only include minor changes in the 802.1ae ASIC, such as supporting multiple SA's (e.g., 20) and supporting automatic switching of SA's upon PN being close to wrapping. Other embodiments entail a non-disruptive upgrade. Rekey protocol exchange processing can still be driven from a supervisor processor without requiring the protocol to be offloaded to a network device processor.

As mentioned herein, techniques of the present invention may be extended to other protocols, such as IPSec. For example, the IPSec's key generation protocol (IKE) can be modified to negotiate multiple keys. IPSec engines can then be configured to automatically move from one key to another in the key set without requiring protocol exchange. Thus, certain embodiments of the present invention can support IPSec (as well as other protocols) on high speed links Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware rekey system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the authentication systems of this invention may be a specially configured switch such as the Catalyst 6500, 4900, 4500, 3750, 3560, Nexus 7000, or Express 500 Series available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 4:
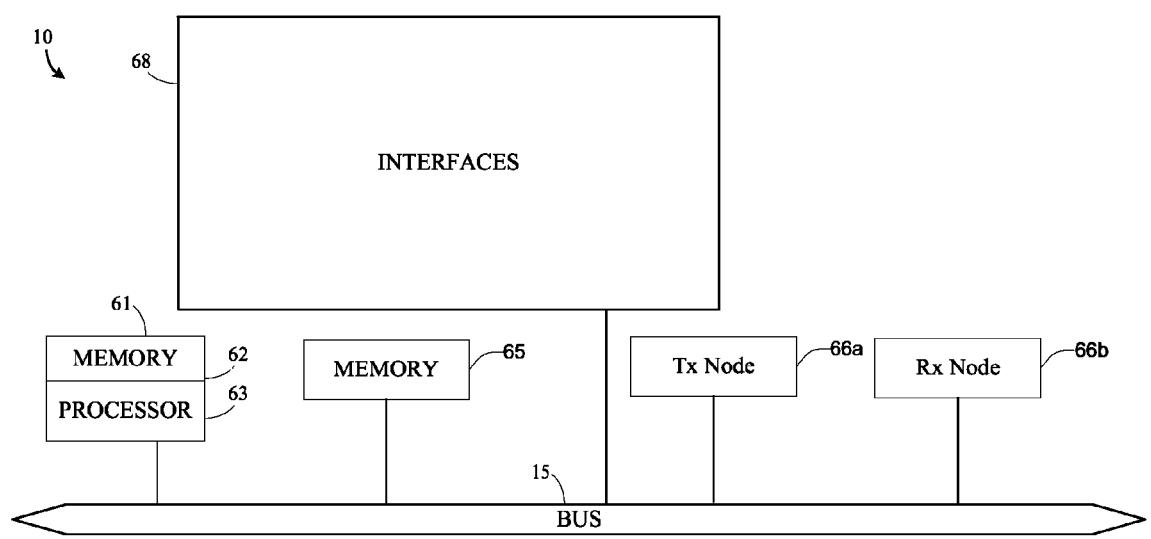
FIG. 4 illustrates an example switch suitable for implementing embodiments of the present invention.

Referring now to FIG. 4, a switch 10 suitable for implementing embodiments of the present invention includes a master central processing unit (CPU) 62, interfaces 68, and a bus 15 (for example, a PCI bus). The switch 10 may also be configured to provide a Tx node 66a and an Rx node 66b, which nodes may be configured by the CPU and memory 65 or other processors and memory. When acting under the control of appropriate software or firmware, the CPU 62 is responsible for such tasks as switching and/or routing computations and network management. It preferably accomplishes all these functions under the control of software including an operating system (for example, the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of switch 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of packets or packet segments over the network and sometimes support other peripherals used with the switch 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching and/or routing, media control and management. By providing separate processors for the communications intensive tasks, these interfaces allow the master microprocessor 62 to efficiently perform switching and/or routing computations, network diagnostics, security functions, etc.

Although the system shown in FIG. 4 is one specific switch of the present invention, it is by no means the only switch architecture on which the present invention can be implemented. For example, an architecture having a single processor that handles communications as well as switching and/or routing computations, etc. is often used. Further, other types of interfaces and media could also be used with the switch.

Regardless of a network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications. The memory or memories may also be configured to store shared keys, SA values, PN values, PN maximum values, transmission and received packets, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, although authentication has been described as authorizing a single device for accessing a single domain, of course, a single device may be authorized to access a plurality of different domains or multiple devices may be authorized to access a same domain. Therefore, the present embodiments are to be considered as illustrative and not restrictive and the invention is not to be limited to the details given herein, but may be modified within the scope and equivalents of the appended claims.

What is claimed is:

1. A method comprising:
a first node participating with a second node in a key generation exchange to thereby allow the first node to transmit secure packets to the second node;
during participation in the key generation exchange, obtaining at the first node key generation information that includes a plurality of current security associations that differ from each other;
after the key generation exchange, sequentially sending, from the first node to the second node, a first set of secure packets that each include a first one of the plurality of current security associations, the first set of secure packets further comprising different incremented packet numbers, wherein the different incremented packet numbers are contained in a packet field that is sized to hold values in a range from a minimum value up to a maximum value; and
after sending a last packet of the first set of secure packets, wherein the last packet has a packet number that is a predefined amount from the maximum value, sequentially sending, from the first node to the second node, a next set of secure packets that each include a next one of the plurality of current security associations, the next set of secure packets further comprising different incremented packet numbers,
wherein the sending of the next set of secure packets that each include the next one of the plurality of security associations is accomplished without the first node participating with the second node in another key generation exchange or a communication regarding the next one of the plurality of security associations.

2. The method as recited in claim 1, further comprising repeating the operation of sending a next set of secure packets after each time a last packet having a packet number that is the predefined amount from the maximum value is sent, until all of the current security associations have been used.

3. The method as recited in claim 2, further comprising:
after all of the current security associations have been used, the first node participating with the second node in a subsequent key generation exchange;
during participation in the subsequent key generation exchange, obtaining at the first node key generation information that includes a plurality of next security associations that differ from each other;
after the subsequent key generation exchange, sequentially sending, from the first node to the second node, a subsequent first scl of secure packets that each include a first one of the next security associations, the subsequent first set of secure packets further comprising different incremented packet numbers; and
wherein the sending of the subsequent next set of secure packets is accomplished without the first node participating with the second node in another key generation exchange after the first and subsequent key generation exchanges.

4. The method as recited in claim 1, wherein the key generation exchange and the first and second set of secure packets utilize 802.1ae protocol.

5. The method as recited in claim 1, wherein each secure packet includes encrypted information that is encrypted using one or more keys from the key generation information.

6. A first apparatus communicatively coupled with a second apparatus, the method comprising:
one or more processors;
one or more memory, wherein at least one of the processors or the memory are adapted for:
a first apparatus participating with a second apparatus in a key generation exchange to thereby allow the first apparatus to transmit secure packets to the second apparatus;
during participation in the key generation exchange, obtaining at the first apparatus key generation information that includes a plurality of current security associations that differ from each other;
after the key generation exchange, sequentially sending, from the first apparatus to the second apparatus, a first set of secure packets that each include a first one of the current security associations, the first set of secure packets further comprising different incremented packet numbers, wherein the different incremented packet numbers are contained in a packet field that is sized to hold values in a range from a minimum value up to a maximum value; and
after sending a last packet of the first set of secure packets, wherein the last packet has a packet number that is a predefined amount from the maximum value, sequentially sending, from the first apparatus to the second apparatus, a next set of secure packets that each include a next one of the current security associations, the next set of secure packets further comprising different incremented packet numbers,
wherein the sending of the next set of secure packets that each include the next one of the plurality of security associations is accomplished without the first apparatus participating with the second apparatus in another key generation exchange or a communication regarding the next one of the plurality of security associations.

7. The first apparatus as recited in claim 6, wherein at least one of the processors or the memory are further adapted for repeating the operation of sending a next set of secure packets after each time a last packet having a packet number that is the predefined amount from the maximum value is sent, until all of the current security associations have been used.

8. The first apparatus as recited in claim 7, wherein at least one of the processors or the memory are further adapted for:
after all of the current security associations have been used, the first apparatus participating with the second apparatus in a subsequent key generation exchange;
during participation in the subsequent key generation exchange, obtaining at the first apparatus key generation information that includes a plurality of next security associations that differ from each other;
after the subsequent key generation exchange, sequentially sending, from the first apparatus to the second apparatus, a subsequent first set of secure packets that each include a first one of the next security associations, the subsequent first set of secure packets further comprising different incremented packet numbers; and
after sending a last packet of the subsequent first set of secure packets, wherein the last packet has a packet number that is the predefined amount from the maximum value, sequentially sending, from the first apparatus to the second apparatus, a subsequent next set of secure packets that each include a next one of the next security associations, the subsequent next set of secure packets further comprising different incremented packet numbers, wherein the sending of the subsequent next set of secure packets is accomplished without the first apparatus participating with the second apparatus in another key generation exchange after the first and subsequent key generation exchanges.

9. The first apparatus as recited in claim 6, wherein the key generation exchange and the first and second set of secure packets utilize 802.1ae protocol.

10. The first apparatus as recited in claim 6, wherein each secure packet includes encrypted information that is encrypted using one or more keys from the key generation information.

11. A method comprising:
a first node participating with the second node in a key generation exchange to thereby allow the first node to receive secure packets from the second node;
during participation in the key generation exchange, retaining at the first node key generation information that includes a plurality of current security associations for the second node that differ from each other;
sequentially receiving, from the second node, a first set of secure packets that each include a first one of the current security associations for the second node, the first set of secure packets further comprising different incremented packet numbers;
sequentially receiving, from the second node, a second set of secure packets that each include a second one of the current security associations for the second node, the second set of secure packets further comprising different incremented packet numbers;
wherein the first and second sets of secure packets are received without the first node participating with the second node in another key generation exchange or a communication regarding the second one of the current security associations.

12. The method of claim 11, further comprising dropping each secure packet that is determined to not be valid.

13. The method of claim 11, further comprising:
wherein it is determined that the secure packets of the first set are valid,
wherein it is determined that the secure packets of the second set are valid,
wherein the first and second sets of secure packets are determined to be valid without the first node participating with the second node in another key generation exchange or a communication regarding the second one of the current security associations.

14. A first apparatus communicatively coupled with a second apparatus, the method comprising:
one or more processors;
one or more memory, wherein at least one of the processors or the memory are adapted for:
the first apparatus participating with the second apparatus in a key generation exchange to thereby allow the first apparatus to receive secure packets from the second apparatus;
during participation in the key generation exchange, retaining at the first apparatus key generation information that includes a plurality of current security associations for the second apparatus that differ from each other;
sequentially receiving, from the second node, a first set of secure packets that each secure packets further comprising different incremented packet numbers;
sequentially receiving, from the second node, a second set of secure packets that each include a second one of the current security associations for the second node, the second set of secure packets further comprising different incremented packet numbers;
wherein the first and second sets of secure packets are received without the first node participating with the second node in another key generation exchange or a communication regarding the second one of the current security associations.

15. The method of claim 14, wherein at least one of the processors or the memory are further adapted for dropping each secure packet that is determined to not be valid.

16. The method of claim 14, wherein at least one of the processors or the memory are further adapted for:
wherein it is determined that the secure packets of the first set are valid,
wherein it is determined that the secure packets of the second set are valid,
wherein the first and second sets of secure packets determined to be valid without the first node participating with the second node in another key generation exchange or other communication regarding the second one of the current security associations.

17. A system comprising:
a first node including a processor and a memory;
a second node including a processor and a memory, the second node being communicatively coupled with the first node,
wherein the first node is adapted as a transmitter module configured for performing the following operations:
(a) participating with the second node in a key generation exchange to thereby allow the first node to transmit secure packets to the second node;
(b) during participation in the key generation exchange, obtaining at the first node key generation information that includes a plurality of current security associations that differ from each other;
(c) after the key generation exchange, sequentially sending, from the first node to the second node, a first set of secure packets that each include a first one of the current security associations, the first set of secure packets further comprising different incremented packet numbers, wherein the different incremented packet numbers are contained in a packet field that is sized to hold values in a range from a minimum value up to a maximum value; and
d) after sending a last packet of the first set of secure packets, wherein the last packet has a packet number that is a predefined amount from the maximum value, sequentially sending, from the first node to the second node, a next set of secure packets that each include a next one of the current security associations, the next set of secure packets further comprising different incremented packet numbers,
wherein the sending of the next set of secure packets that each include the next one of the plurality of security associations is accomplished without the first node participating with the second node in another key generation exchange or a communication regarding the next one of the plurality of security associations.

18. The system of claim 17, wherein the second node (e) participating with the first node in a key generation exchange to thereby allow the second node to receive secure packets from the first node;

(f) during participation in the key generation exchange, retaining at the second node key generation information that includes a plurality of current security associations for the first node that differ from each other;

(g) for each secure packet received by the second node from the first node, determining that the received secure packet is valid based on whether a security association of the received secure packet matches a retained security association for the first node and whether a packet number of the received secure packet has been incremented for the matching security association; and (g) processing each valid packet.

19. The system of claim 18, wherein the second node is further adapted as a transmitter module configured for performing operations, comprising:

participating with a third node in a second key generation exchange to thereby allow the second node to transmit secure packets to the third node;

during participation in the second key generation exchange, obtaining at the second node second key generation information that includes a second plurality of current security associations that differ from each other;

after the second key generation exchange, sequentially sending, from the second node to the third node, a first set of secure packets that each include a first one of the second plurality of current security associations, the first set of secure packets further comprising different incremented packet numbers, wherein the different incremented packet numbers are contained in a packet field that is sized to hold values in a range from a minimum value up to a maximum value; and after sending a last packet of the first set of secure packets, wherein the last packet has a packet number that is a predefined amount from the maximum value, sequentially sending, from the second node to the third node, a next set of secure packets that each include a next one of the second plurality of current security associations, the next set of secure packets further comprising different incremented packet numbers, wherein the sending of the next set of secure packets is accomplished without the second node participating with the third node in another key generation exchange.

20. The system of claim 17, wherein the first node is further adapted as a transmitter module configured for repeating the operation of sending a next set of secure packets after each time a last packet having a packet number that is the predefined amount from the maximum value is sent, until all of the current security associations have been used.

* * * * *